United States Patent [19]

Graf

[11] 4,016,468
[45] Apr. 5, 1977

[54] CONTROLLED RECTIFIER MOTOR DRIVE SYSTEM INCLUDING D.C. FAULT DETECTION AND COMMUTATION MEANS

[75] Inventor: Carlton E. Graf, Erie, Pa.
[73] Assignee: General Electric Company, Erie, Pa.
[22] Filed: Mar. 18, 1975
[21] Appl. No.: 559,612
[52] U.S. Cl. .............. 318/434; 318/506; 321/13
[51] Int. Cl.² ........................ H02K 23/66
[58] Field of Search .......... 318/434, 506, 345; 317/33 SC; 321/13, 12, 11

[56] References Cited
UNITED STATES PATENTS

| | | | |
|---|---|---|---|
| 2,510,616 | 6/1950 | Bany et al. | 321/12 |
| 3,394,299 | 7/1968 | Lawn et al. | 321/11 |
| 3,526,819 | 9/1970 | Graf | 318/341 |
| 3,538,412 | 11/1970 | Graf et al. | 318/345 |
| 3,569,819 | 3/1971 | Martzloff et al. | 321/12 |
| 3,646,398 | 2/1972 | Kotos | 317/33 SC |
| 3,743,908 | 7/1973 | Betke | 318/345 |
| 3,746,964 | 7/1973 | Guyton | 321/5 |
| 3,813,591 | 5/1974 | Dinger | 318/331 |

Primary Examiner—Robert K. Schaefer
Assistant Examiner—John J. Feldhaus
Attorney, Agent, or Firm—Arnold E. Renner; Philip L. Schlamp

[57] ABSTRACT

A motor control system of the type employing phase controlled rectifiers for controlling the power supplied from a polyphase alternating current source to a direct current motor includes circuitry to detect the existence of a rectifier which is conducting at an improper time and to provide appropriate corrective action to terminate such improper conduction.

10 Claims, 10 Drawing Figures

CONTROLLED RECTIFIER MOTOR DRIVE SYSTEM INCLUDING D.C. FAULT DETECTION AND COMMUTATION MEANS

BACKGROUND OF THE INVENTION

The present invention relates generally to fault detection in a polyphase alternating current (a.c.) to direct current (d.c.) conversion system and more particularly to the detection of an improperly conducting controlled rectifier within a bridge circuit utilized to supply a d.c. motor with power from an a.c. source and to means for correcting or rendering nonconductive such an improperly conducting rectifier.

It is well known in the art to provide a system for the conversion of a.c. to d.c. through the use of a full wave rectification bridge employing a plurality of controlled rectifiers which, today, are usually thyristors of the type known as silicon controlled rectifiers (SCRs). It is also well known that, whether the system be single phase or polyphase, the value of the d.c. voltage at the output of the rectifying bridge can be varied by controlling the phase firing angle of the individual bridge rectifiers. Phase angle control, as is well understood in the art, means that the individual rectifiers are fired at controllable times within the applied voltage cycle such that they are conductive only for a portion of the cycle. The use of such bridge circuits for the control of d.c. motors is also well known in the art and such systems normally employ a variety of feedback and control circuits to adjust the phase firing angle of the rectifier bridge so as to control the motor operation through the control of the voltage applied to the motor. An example of such a system employing a current limit feature is shown and described in U.S. Pat. No. 3,526,819, "Current Limit For Motor Control Systems" by C. E. Graf, issued Sept. 1, 1970, which patent is specifically incorporated hereinto by reference.

Controlled rectifier power conversion systems for motor control such as are here being described are particularly susceptible to what are known as d.c. faults or "shoot-throughs" when the motor is operating in the regenerative mode. A d.c. fault occurs when one or more of the rectifiers of the bridge are conducting at a time when the should be nonconducting. These faults or shoot-throughs may result from a variety of reasons including the failure of a particular rectifier to fire or conduct at its appointed time because of an intermittently faulty rectifier firing circuit connector or firing control. It may also be the result of the failure of one rectifier to commutate off its predecessor due to excessive current or lack of sufficient volt-seconds due to a.c. supplied line voltage reduction. Other possible causes include the false firing of one rectifier in the same a.c. supply phase as the rectifier properly fired due to excessive anode to cathode change of voltage with respect to time and electrical noise coupled into the firing circuit associated with the rectifiers. Regardless of the cause of the d.c. fault or shoot-through, the end result may be fuse failure and sudden shut down of the drive or, in a more exaggerated case, the excessive currents may cause damage to the motor, if the motor is not otherwise protected.

SUMMARY OF THE INVENTION

It is, therefore, an object of the present invention to provide an improved means for the detection and correction of a d.c. fault in a motor control system.

It is another object to provide, in a d.c. motor control system, improved means for detecting the improper conduction of a controlled rectifier in a supply bridge and for providing corrective action with respect thereto.

It is a further object, in a d.c. motor control system, to detect the failure of a controlled rectifier in a supply bridge to properly commutate and to force the commutation of that rectifier by the earlier than normal firing of the next scheduled to fire rectifier.

It is an additional object to provide economical circuitry for the detection and correction of an improperly conducting controlled rectifier in the supply bridge of a polyphase a.c. to d.c. conversion unit utilized for the control of a d.c. motor.

It is a still further object, in a polyphase a.c. supply system employing line commutated controlled rectifiers in which a first controlled rectifier is commutated by the firing of a second rectifier, to provide an improved means for the detection and correction of the failure of the first of these rectifiers to properly commutate.

It is recognized that, in the case of a d.c. fault, the d.c. current will rapidly rise while the a.c. current will decrease toward zero. As such, the most straight forward approach to the recognition of a fault would be to measure both the a.c. phase currents and the d.c. motor current and to compare them. The accurate detection of d.c. current magnitude, however, is difficult and expensive. Accordingly, the above objects are achieved in accordance with the present invention by providing suitable circuitry which simultaneously detects the occurrence of: (1) a substantial difference between the voltage of the a.c. to d.c. conversion unit and the counter electromotive force (cemf) of the motor; (2) a voltage of the d.c. motor bus (terminal voltage) which is at or nearly at zero volts (the motor bus would be at approximately zero volts when the motor is first starting then the cemf would also be approximately zero); and, (3) an a.c. supply current which is decreasing, i.e. going to zero. The simultaneous occurrence of the three above listed criteria indicates a d.c. fault or the improper conduction of a controlled rectifier within the bridge and this simultaneous occurrence is utilized to provide a suitable signal which is employed to advance the firing angle of the rectifier in the bridge which is next scheduled to fire to render that rectifier conductive and to commutate off the rectifier which is improperly conducting.

BRIEF DESCRIPTION OF THE DRAWINGS

While the claims annexed to and forming a part of this specification particularly point out and describe what is the present invention, a better understanding thereof can be had by reference to the following detailed description taken in conjunction with the accompanying drawing in which:

DETAILED DESCRIPTION

Figure 1:
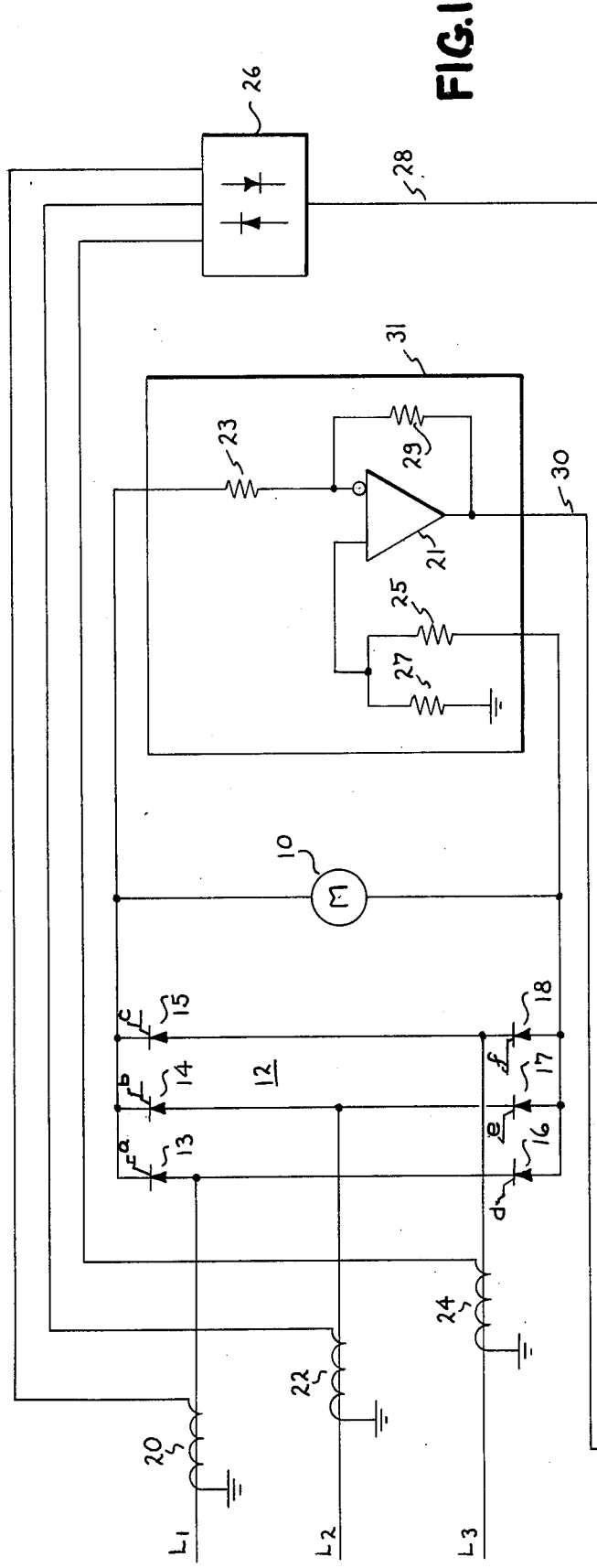
FIG. 1 is a major block diagram showing the overall system employing the present invention in its preferred embodiment.
Figure 1:
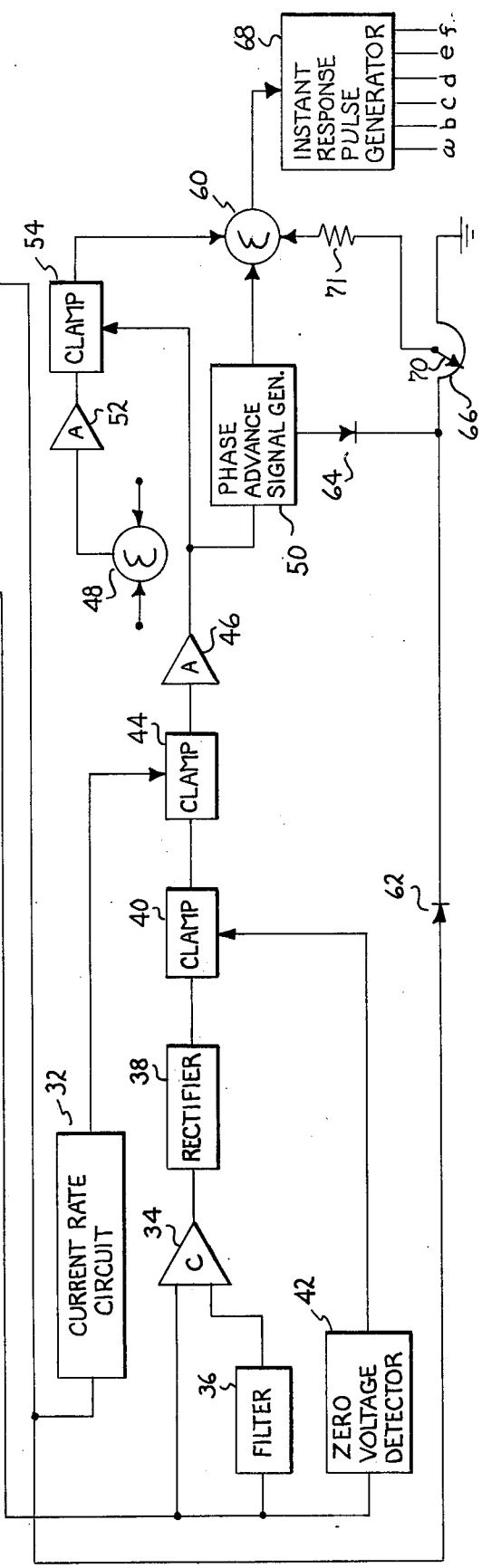
Figure 2:
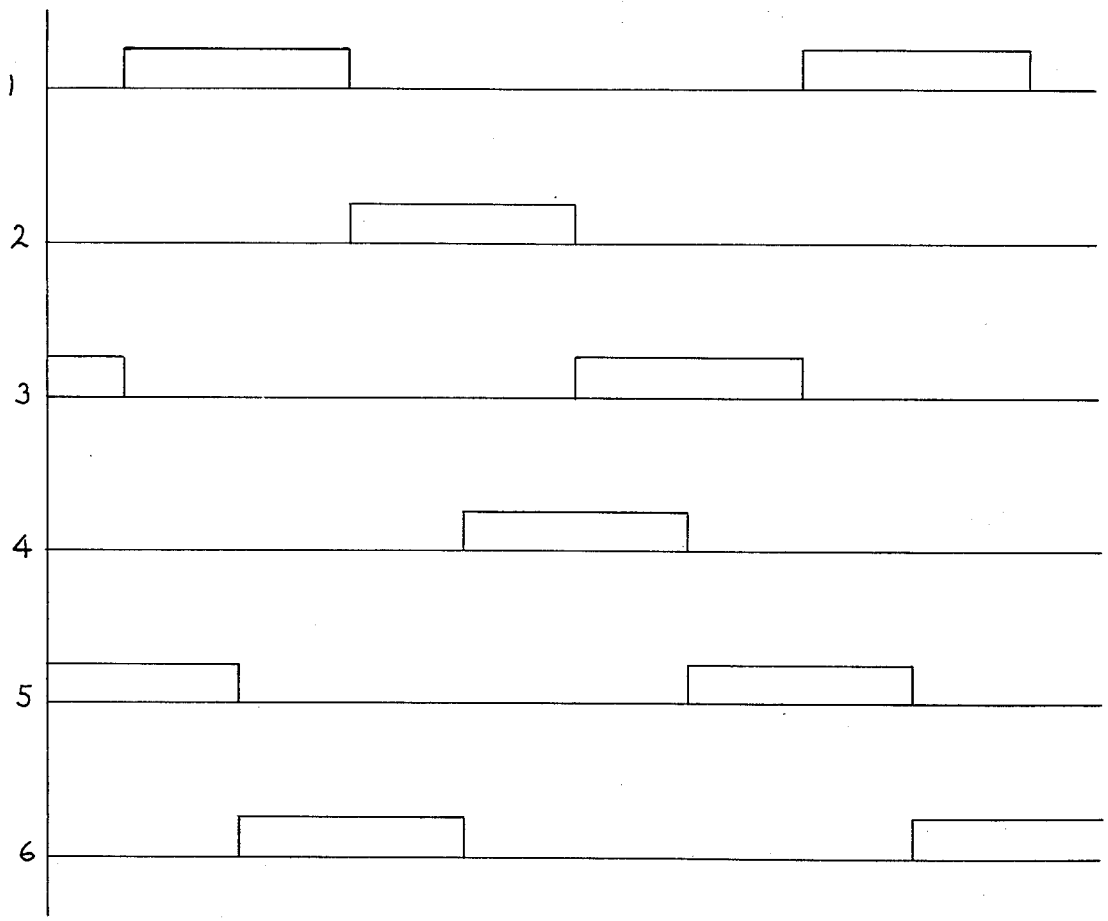
FIG. 2 is a timing chart illustrating the normal firing sequence of a three phase, six thyristor (SCR) rectification bridge.

Referring now to FIG. 1, there is shown a d.c. motor 10 which is provided with variable voltage d.c. power from a three phase source illustrated by lines $L_1$, $L_2$ and $L_3$ by way of a conventional phase controlled full wave rectifying bridge shown generally at 12. Bridge 12 is comprised of six controlled rectifiers 13 through 18 which are illustrated as SCRs having, respectively, gating electrodes a through f. As is well known in the art, the value of the voltage applied to the motor 10 is a function of the point in time at which the individual rectifiers 13 through 18 are rendered conductive. The initiation of conduction is by the application of a suitable applied anode to cathode voltage and a gating signal at the rectifier's gating electrode. The system thus shown is of the general type which is described in the aforementioned U.S. Pat. No. 3,526,819 and into which type the present invention may be incorporated. FIG. 2 illustrates the normal rectifier firing sequence in which a rectifier may be fired or rendered conductive every 60 electrical degrees and can conduct for 120 electrical degrees before being commutated off by the firing of the next rectifier in the firing sequence. Relating FIG. 2 to the rectifiers of the bridge 12 of FIG. 1, the lines 1 through 6 of FIG. 2 correspond to the firing time availability of rectifiers 13 through 18, respectively, of FIG. 1.

Returning to FIG. 1, two feedback paths are provided to provide the desired signals for the operation of the present invention. The first of these feedback signals is one which is proportional to the a.c. current. To this end there are provided three currrent transformers 20, 22 and 24 associated, respectively, with the lines $L_1$, $L_2$ and $L_3$. Each of the transformers provides a signal to a full wave rectification bridge illustrated by a block 26 having an output line 28. As such, there appears on line 28 a signal having a value which is proportional to the instantaneous sum of the currents in the three a.c. lines. The a.c. current signal (line 28) forms the single input to a current rate circuit 32 which circuit provides the function of determining whether the a.c. current is rising or falling. If the signal on line 28 is falling or remaining substantially constant, the current rate circuit 32 does not provide an output signal whereas if it is rising, there is provided an output therefrom which forms an input to a clamp circuit 44 for purposes to be hereinafter described.

The second feedback signal is a voltage signal appearing on a line 30 which is taken from a voltage isolation circuit 31 connected to the terminals of the d.c. motor 10. The type of isolation used is not important to the present invention it being desired to prevent the large magnitude voltages which appear at the motor terminals from reaching the control circuitry of the present invention. Other forms of isolation such as magnetic or light, all of which are well known in the art, could be used with equal facility. In the illustrated embodiment, however, impedance isolation was chosen and to this end the circuit includes an operational amplifier 21 having its inverting and noninverting inputs connected, to the terminals of the motor 10 by way of resistors 23 and 25, respectively. Resistors 23 and 25 will normally be equal and of high resistance; e.g. in the order of a megohm each. A resistor 29 is connected between the amplifier output and its inverting input and an additional resistor 27 is tied between ground and the noniverting inverter input. Resistors 27 and 29 will normally be of the same value and much smaller than resistors 23 and 25 (for example, 20K ohms). As such, there will appear at the output of the amplifier 21 (line 30) a signal representative of the motor terminal voltage. It should be noted that, under normal operating circumstances, the motor terminal voltage will approximate the cemf of the motor, differing therefrom by the IR and ix drop of and IX drop motor. As such, the signal on line 30 can be utilized to represent not only the output of the bridge (motor terminal voltage) but may also be utilized to develop a signal approximating the cemf of the motor as will be more fully explained hereinafter.

Figure 3A:
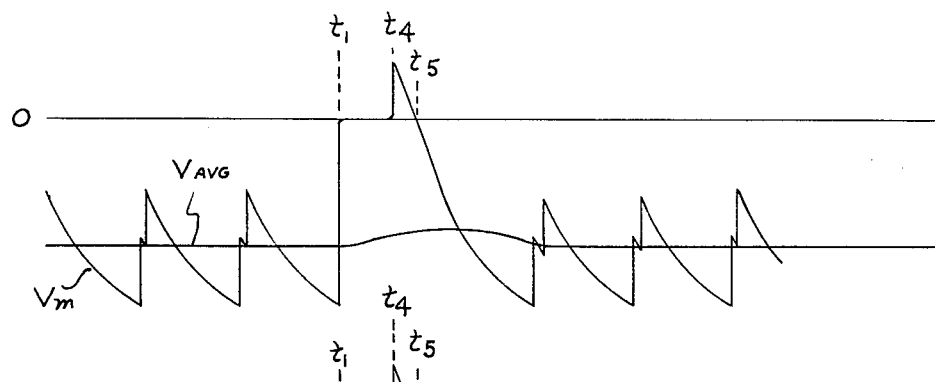
FIGS. 3a – 3f are graphs illustrating various wave shapes occurring within the circuitry of the present invention and useful in the understanding thereof; and, FIGS. 4a and 4b illustrate in greater detail the major components of the present invention shown in block form in FIG. 1.
Figure 3B:
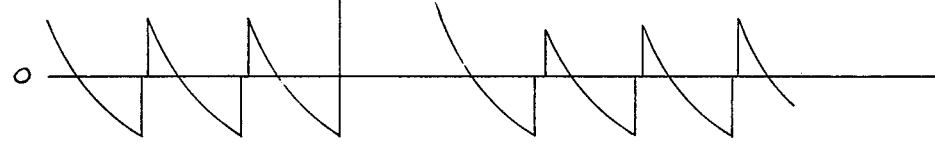
Figure 3C:
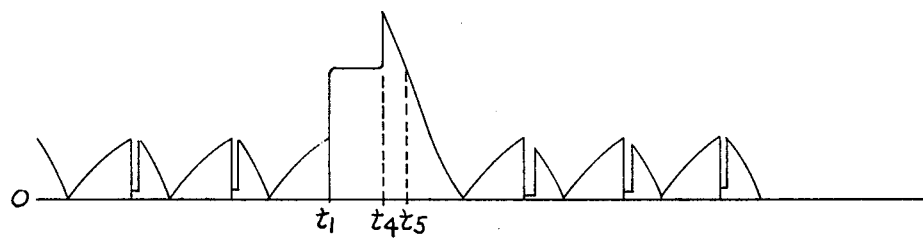

The voltage feedback signal (line 30) acts as one input to a two input comparator 34 the second input to which is the output of a filter 36 which also has the voltage feedback signal applied thereto as an input. As previously stated, the voltage feedback signal on line 30 represents the instantaneous terminal voltage of the motor 10 and is illustrated in FIG. 3a by the line $V_m$. The normal condition of that voltage is shown to the left of time $t_1$ in FIG. 3a. The filter 36 serves as an averaging circuit such that its output is substantially, a steady-state value proportional to the amf of the motor as illustrated In FIG. 3a by the line $V_{avg}$. Comparator 34 compares these two input signals and provides, as its output, a signal which represents the ripple voltage of the d.c. motor around zero volts as illustrated in FIG. 3b. This signal is provided to a rectifier circuit 38 which provides a full wave rectification with respect to its input signal to provide an output to a clamp circuit 40. The rectified ripple signal is illustrated in FIG. 3c.

The voltage feedback signal on line 30 is also provided to a zero voltage detector 42 which provides an output signal to the clamp circuit 40 at all times excepting when the voltage on line 30 is approximately zero volts. As will be better understood as this description proceeds, the signal on line 30 will have some value either positive or negative at all times excepting during the occurrence of a d.c. fault (between $t_1$ and $t_4$ of FIG. 3a) when the voltage feedback signal will be approximately zero volts—differing therefrom only by the voltage drop across two conducting rectifiers and the associated wiring. Thus, except when the voltage feedback signal is zero, a signal from the detector 42 applied to the clamp 40 will prohibit the passage of any signal through that clamp. In a similar manner when there is an output from the current pulse rate circuit 32, clamp 44 inhibits the passage of any signal therethrough.

The output of clamp circuit 44 is applied to a suitable amplifier 46, having a selected input threshold, the output of which forms the input to a phase advance signal generator 50. When the phase advance signal generator 50 receives an input signal from amplifier 46, it provides an output signal of a fixed value which is applied to a summing junction 60 the output of which forms the input to an instant response pulse generator 68. The instant response pulse generator 68 may be of any of those well known in the art and serves to provide a plurality of output signals, represented by lines a through f, to the corresponding gate terminals of the bridge rectifiers 13 through 18, respectively, in accordance with the value of the signal applied thereto. In the example being described, generator 68 would correspond to that generator of similar nomenclature in the aforementioned U.S. Pat. No. 3,526,819.

In order to place the present invention in proper context with respect to the prior art, there is shown a second input to summing junction 60 from a clamp circuit 54, which in turn is provided with a signal from an amplifier 52 having an input from a summing junction 48. Summing junction 48 represents other control functions which would normally be prevalent in a system of this kind and would correspond, for example, to what is shown as summing junction 42 in the patent just mentioned. Again in context, were no d.c. fault present such that there would be no signal emanating from the phase advance signal generator 50, the normal control signals for controlling the angle of firing of the rectifiers of the bridge would be derived from the several inputs to the summing junction 48 as properly amplified by amplifier 52. Clamp 54 would not be operative at this time and the output of amplifier 52 would serve as the input signal to the instant response pulse generator 68 to control the action of the rectifying bridge. In the present embodiment, clamp 54 receives as a second input the output of amplifier 46. It is desired, in the present invention, to place the control of the bridge 12 solely under the control of the present invention when there is a d.c. fault. Thus, the output from amplifier 46 as applied to clamp 54 serves to block the normal control signals coming from summing junction 48 and hence prevent those control signals from reaching summing junction 60.

It will be remembered that the output of the phase advance signal generator 50 was stated to be a fixed value signal. As such the application of this signal to the generator 68 will serve to advance firing of the next bridge rectifier by a fixed amount. Normally, in the preferred embodiment of the invention this advance would be approximately 60 electrical degrees and the value of the signal from the generator 50 would be predetermined to effect that advance. It is recognized, however, that the desired amount of phase advance is a function of the a.c. line impedance. Specifically, if the a.c. line impedance is low, then the example of approximately 60° would be sufficient. However, if the a.c. line impedance is high the time required to commutate off the rectifier which is improperly conducting is increased and in this situation it is desirable to add additional phase advancement. Accordingly, as is shown in FIG. 1, there is provided a diode 64 which conducts a signal from the phase advance generator 50 to a potentiometer 66 connected between the diode 64 and ground. Wiper arm 70 of potentiometer 66 is manually adjustable such that the variations in line impedance can be adequately compensated for. The signal applied to the potentiometer 66 via diode 64 is normally a scaled value of the signal applied to summing junction 60 from the generator 50 and is, preferably, of the same polarity. Thus, if the a.c. line is of low impedance and very little additional phase advance is needed, the potentiometer arm 70 would be set at its lowest position so that little or no additional advance signal is provided to summing junction 60 through a scaling resistor 71. On the other hand, if the a.c. line has a high impedance the potentiometer wiper arm would be set at its upper position to provide a signal representing a maximum additional phase advance, for example, 25 electrical degrees phase shift.

The last depiction of FIG. 1 is the application of the current feedback signal on line 28 through a diode 62 to the ungrounded side of the potentiometer 66. The signal thus applied to potentiometer 64 serves as a safeguard to limit the amount of phase retardation which is possible by the instant response pulse generator 68. It is recognized that the maximum amount of phase retardation which can be permitted without a commutation problem is a function of the a.c. line impedance and the current through the rectifiers 13 through 18 and that as the current increases additional time is required to effect commutation. In systems such as are here being described, it is common to permit as maximum retardation of 150 electrical degrees. It is, however, known that if the combination of a.c. line impedance and rectifier current is high, more than the 30 degree difference between 180 and 150 is necessary to insure proper commutation. Therefore, the feedback signal applied through diode 62, potentiometer 66 and resistor 71 to the summing junction 60 limits the amount of retardation such that if all other control were to be removed from the instant response generator, retardation would be limited to the value established by this signal as a function of the value of the a.c. currents and the a.c. line impedance as set by the potentiometer.

Figure 3D:
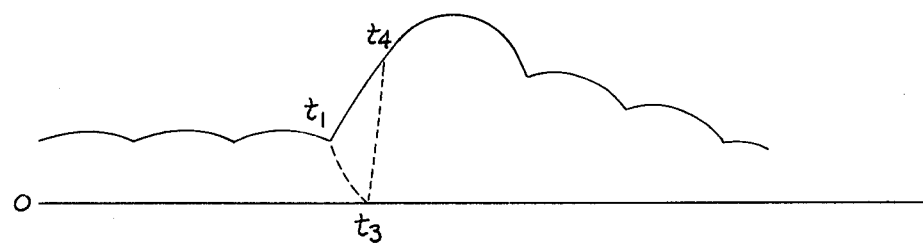

The operation of FIG. 1 is substantially as follows. The signal representing the terminal voltage of the motor 10 is applied via line 30 to the filter 36 and the comparator 34 such that there is provided at the output of comparator 34 a signal which has a significant value if there is a substantial difference between the value of the output voltage of the bridge 12 and the cemf of the motor. This signal is rectified by rectifier 38 whose output is provided to the clamping circuit 40. If the value of the voltage feedback signal on line 30 is other than zero (approximate), zero voltage detector 42 provides an output signal to a clamp 40 and prevents further transmission of the signal from the rectifier 38. In the event the zero voltage detector 42 sees a voltage feedback signal of approximately zero volts, the clamping signal to 40 is removed and the signal from the rectifier 38 is permitted to pass to the second clamp 44. The current feedback signal on line 28 is interrogated by the current rate circuit 32 which provides an output signal to the clamp 44 when the current is increasing in value. Thus, if the a.c. current is going to zero, as is illustrated by the dotted line extending between $t_1$ and $t_3$ of FIG. 3d, the signal from current rate circuit 32 is removed from clamp 34 and the signal from clamp 40 is permitted to pass to amplifier 46 and from there to the phase advance signal generator 50. (FIG. 3d is basically an illustration of the d.c. motor current. The a.c. current will closely approximate the d.c. current excepting when a fault occurs. The a.c. deviations from d.c. are shown by the dotted lines in this figure.)

The presentation of a signal to generator 50 thus occurs only upon the satisfaction of the three requirements which were earlier set forth. That is, there is a substantial difference between the value of the output voltage of the bridge and the cemf of the motor, the a.c. current is going to zero and motor bus voltage is approximately zero. As previously described, the output of the amplifier 46 when applied to clamp 54 prevents the normal control signals attendant to the overall system from being applied to the summing junction 60 and this same signal also effects an output from the phase advance signal generator 50 to provide an input to the junction 60. The additional signal relating to the compensation for a.c. line impedance (via diode 64) is combined with the output of generator 50 in summing junction 60 to provide the control input to the instant response pulse generator 68 which, in turn, provides a suitable control signal on the appropriate one of the lines a through f to effect the advanced firing of the rectifier in the bridge next scheduled to be fired and hence commutate the rectifier which previously failed to commutate and was improperly conducting.

Figure 4A:
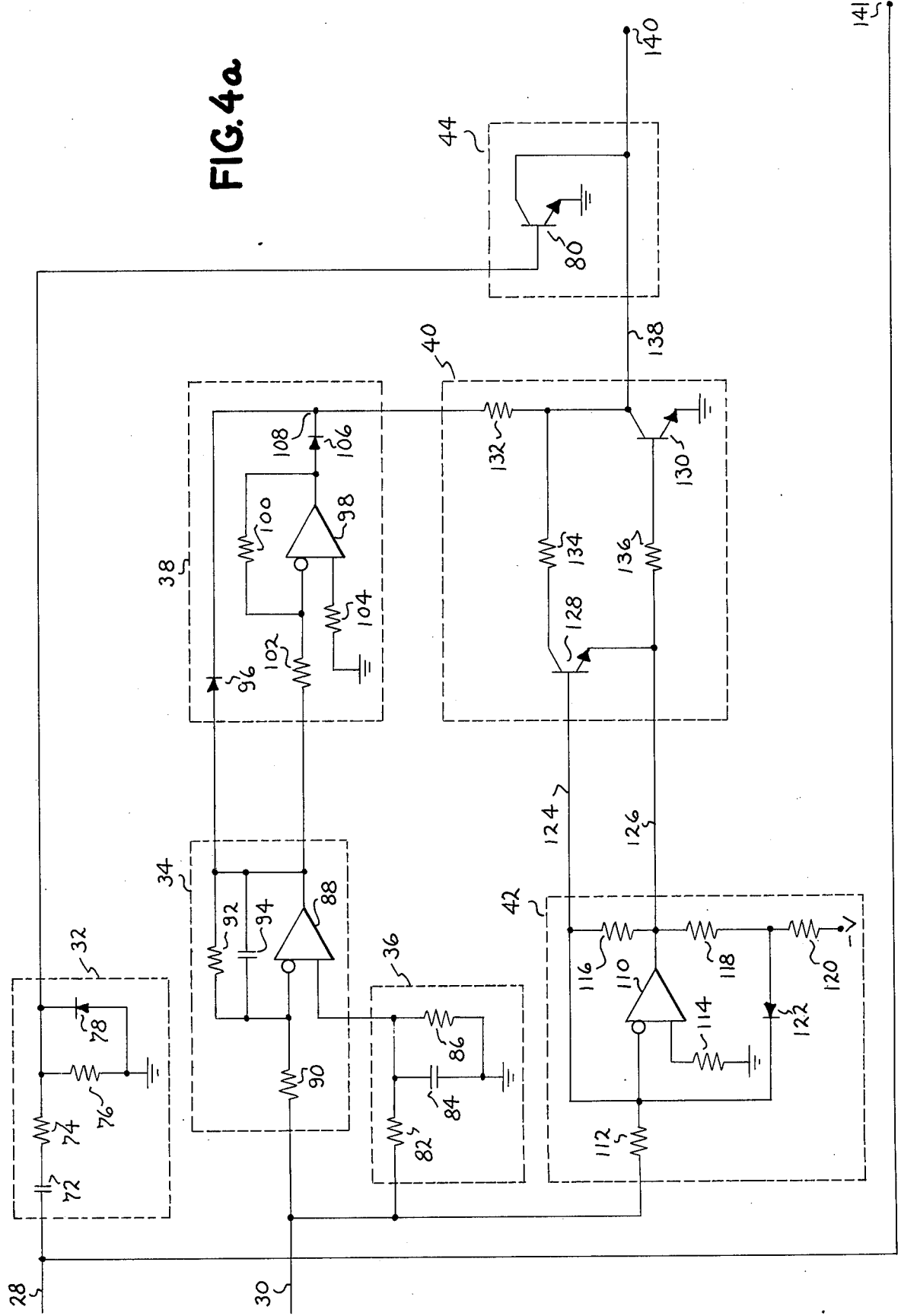
Figure 4B:
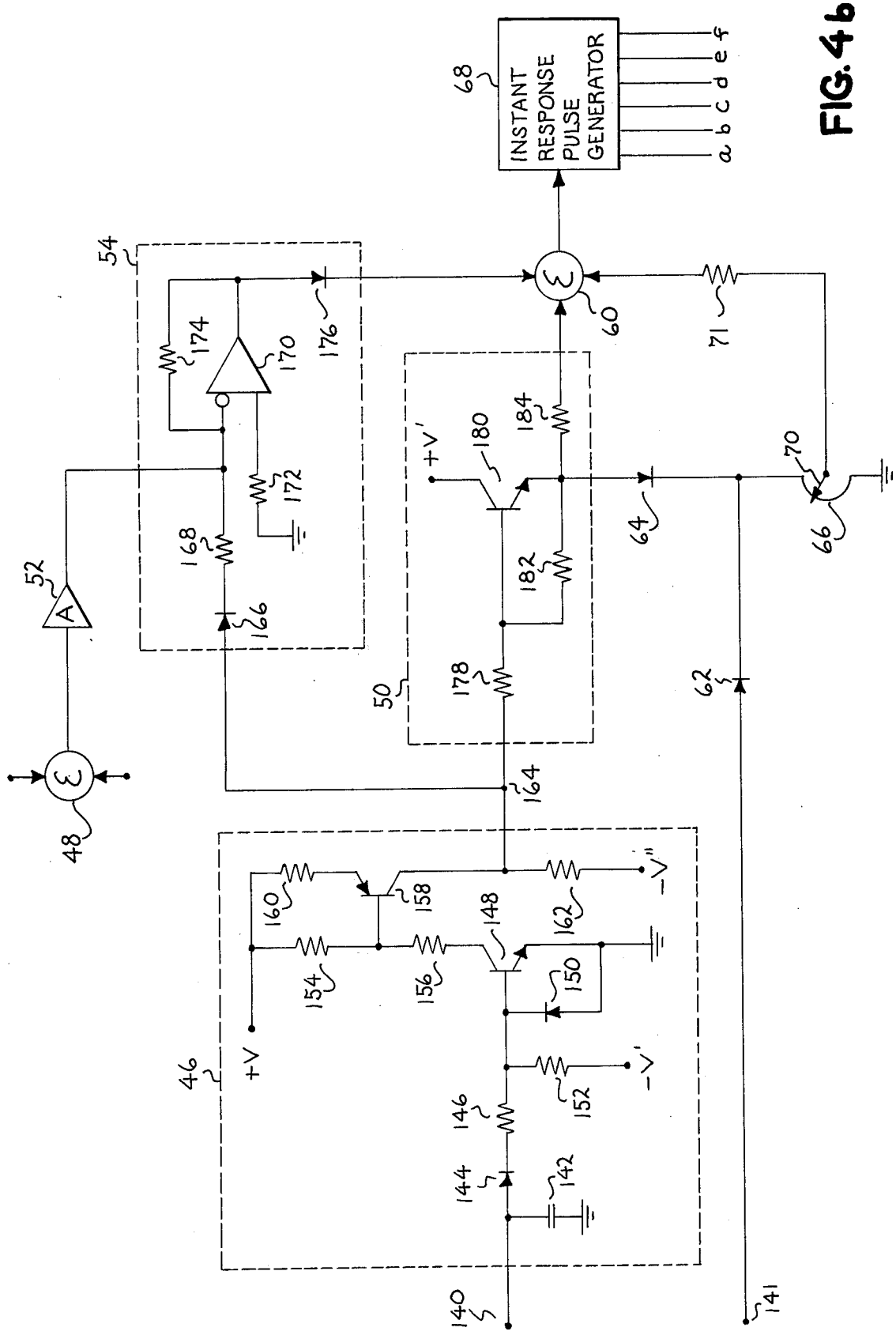

Reference is now made to FIGS. 4a and 4b which illustrate in detail the elements of the preferred embodiment of the present invention which are shown in block form in FIG. 1. In FIGS. 4a and 4b the current feedback signal appears on line 28 and is applied through the diode 62 to the top of potentiometer 66 in a manner and for the purpose previously described. The current feedback signal on line 28 is also applied to the current rate circuit 32 which forms a lead circuit and is comprised of a capacitor 72 in series with a resistor 74 with the free end of resistor 74 being connected to ground through the parallel combination of a resistor 76 and a diode 78 poled to conduct from ground to the free end of resistor 74. The free end of resistor 74 is also connected to the base of a transistor 80 which forms the clamp circuit 44. The current rate circuit 32 determines whether the a.c. current feedback signal is rising or falling and as long as it is rising, capacitor 72 will charge placing a positive voltage on the base of transistor 80. The emitter of this transistor is tied to ground and its collector is connected to the output of the clamp circuit 40. So long as a positive voltage appears at the base of transistor 80 it will be in the conducting state and any signal appearing on the output line from clamp 40 will be passed to ground. When the current feedback signal on line 28 begins to fall, capacitor 72 will begin to discharge and thus place a negative voltage on the base of transistor 80 (clamp 44) turning that transistor off and permitting any signal appearing upon the line from the clamp 40 to pass to the amplifier 46 (FIG. 4b).

Voltage feedback signal (line 30) has, as was previously stated, an appearance similar to that shown by the line $V_m$ in FIG. 3a. This signal is applied to the filter 36 which consists of a series resistor 82 and the parallel combination of a capacitor 84 and a resistor 86 connected between the free end of resistor 82 and ground. The filter 36 preferably has a fairly large time constant so that the output of this filter, which forms the noninverting input to an operational amplifier 88 within the comparator 34, is a fairly constant value roughly equivalent to the cemf of the motor 10 (FIG. 1) as illustrated by the line $V_{avg}$ in FIG. 3a. As shown in FIG. 3a, the signal $V_{avg}$ will remain essentially constant and at a value proportional and roughly equivalent to the cemf of the motor(IR drop of the motor difference) until the time $t_1$, the time of the occurrence of the d.c. fault. At time $t_1$, the voltage feedback signal increases rapidly to zero and the signal $V_{avg}$ will begin to change slowly. However, because of the time constant of the filter 36, this change will be small compared to the change in the feedback signal and will continue until the feedback signal again goes below the value of the signal $V_{avg}$ at which time $V_{avg}$ will return to approximately its original value. It is because of this averaging and the fact that the output of filter 36 changes slowly with respect to changes in the instantaneous value of the signal on line 30 that this signal may be used for the two stated purposes of the output voltage of the bridge (and motor terminal voltage) and to produce a signal approximating the motor cemf (output of filter 36). As will become more apparent as this description proceeds, the fact that the output filter 36 only approximates the motor cemf is of no consequence in the operation of the present invention in that the required result from this portion of the circuit is a substantial difference between the bridge output and the motor cemf. This difference will exist, in accordance with the illustrated embodiment of the present invention, when a d.c. fault does occur and the instantaneous value of this signal on line 30 goes to approximately zero.

The voltage feedback signal line 30 is also applied to the inverting input of operational amplifier 88 of comparator 34 through a series input resistor 90. Amplifier 88 has a feedback path comprising the parallel combination of a resistor 92 and a capacitor 94 connected between its output and its inverting input. Because the comparator 34 compares the average voltage from the filter 36 to the instantaneous voltage feedback signal as it appears on line 30, the output waveshape thereof will be similar to line $V_m$ of FIG. 3a as illustrated in FIG. 3b. This output will be relatively positive and negative about zero and this output is applied to the rectifier circuit 38.

Rectifier circuit 38 includes a diode 96 poled to conduct the positive portions of the output signal of comparator 34 to a terminal 108 which is the output of the rectifier 38. The negative portions of the comparator output are connected by the circuitry including an input resistor 102 connected between the comparator 34 and the inverting input of an operational amplifier 98 having a resistor in feedback between its output and inverting input. The noninverting input to the operational amplifier 98 is connected by way of the resistor 104 to ground and the output thereof is connected through a diode 106 to the junction 108. This circuitry performs an inverting function such that the composite signal appearing at junction 108 is the full wave rectification of the output of the comparator 34 and this composite signal is illustrated in FIG. 3c.

The voltage detector 42 also receives the voltage feedback signal and, as was previously stated, provides an output control signal to the clamp 40 excepting when the voltage feedback is approximately equal to zero. To achieve this function the zero voltage detector 42 includes an operational amplifier 110 having an inverting input to which the voltage feedback (line 30) is applied by way of an input resistor 112. The noninverting input of operational amplifier 110 is connected to ground through a resistor 114. A feedback resistor 116 is connected between the output of the operational amplifier 110 and its inverting input and the output of the amplifier is also connected to a negative voltage, indicated as $-V$, through a series combination of two resistors 118 and 120. A second amplifier feedback path includes a diode 122 connected between the junction of the resistors 118 and 120 and the inverting input of the amplifier 110. Zero voltage detector 42 provides two outputs to the clamp circuit 40 shown as lines 124 and 126. When the voltage feedback signal on line 30 is positive, a positive voltage appears on line 124 in that it is connected to line 30 directly by way of resistor 112. When the voltage feedback signal is negative with respect to ground, operational amplifier 110 and its associated circuitry will provide a positive output on line 126. When the voltage feedback signal on line 30 is zero, neither line 124 nor 126 has a positive voltage and, as will be explained next, the clamp circuit 40 is inactivated and permits the signal applied thereto to pass.

Referencing now the clamp circuit 40, it is seen that it is comprised of two transistors 128 and 130 with the output of the rectifier circuit 38 (FIG. 3b) being applied to the collector of transistor 128 by way of a pair of series connected resistors 132 and 134. The base of transistor 128 is connected to the zero voltage detector 42 by the line 124 and its emitter is connected to the output of inverting amplifier 110 of the detector 42 by way of line 126. The output of the rectifier 38 is also applied to the collector of transistor 130 by way of resistor 132 and the emitter of that transistor is connected to ground. The base of transistor 130 receives one output of the zero voltage detector 42 by way of a resistor 136 and line 126. The output of clamp circuit 40, line 138, which is supplied to the clamp circuit 44 is also taken from the collector of transistor 130. As previously indicated, the output signals from the detector 42 on lines 124 and 126 are positive when the voltage feedback signal on line 30 is positive and negative, respectively. As such, when the voltage feedback signal is positive and there is a positive signal on line 124, transistor 128 is rendered conductive and the input signal to the clamp circuit 40 from the rectifier 38 is therefore clamped or inhibited from appearing on the output line 138. In a similar manner when the voltage feedback signal is negative and the signal on line 126 is positive, transistor 130 is rendered conductive and the output of the rectifier 38 is passed to ground and prohibited from appearing on line 138.

Line 138 is connected to the collector of transistor 80 within clamp circuit 44 which collector also forms the output of the clamp circuit 44 as illustrated by terminal 140.

The portion of the circuitry thus far described in detail performs the essential detection function of the present invention. In brief summary, it is seen from the graphs that the output of the rectifier 38 is of substantial magnitude only during that time when there exists a d.c. fault; that is, the time starting at $t_1$ and continuing approximately to $t_5$ (FIG. 3c). When the voltage feedback signal is other than zero (zero from $t_1$ to $t_4$ as shown in FIG. 3l), the output of the zero voltage detector 42 acting in conjunction with clamp circuit 40 prevents the passage of the rectifier signal. Also, excepting when the a.c. current signal is decreasing towards zero shown by the dotted line between $t_1$ and $t_3$ of FIG. 3d, clamp circuit 44 inhibits the passing of any signal so that there appears at terminal 140, at the output of the clamp circuit 44, a signal only upon the satisfaction of the three criteria of: (1) a substantial voltage difference between the motor cemf and the voltage of the conversion unit, (2) an a.c. current which is going to zero, and (3) a zero motor terminal voltage.

Figure 3E:
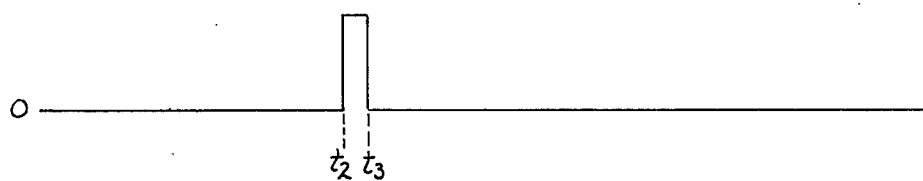

The signal appearing at terminal 140, FIGS. 4a and 4b, is applied to the amplifier 46 of FIG. 4b. Amplifier 46 is a threshold amplifier and includes a capacitor 142 which is connected between the terminal 140 and ground. Capacitor 142 serves a filtering function to prevent spurious signals from affecting the operation of the overall invention. As such, a signal of relatively few volt-seconds will be insufficient to charge the capacitor. When, however, a larger signal such as that caused by a d.c. fault such as is illustrated by the signal between $t_1$ and $t_5$ of FIG. 3b is presented, capacitor 42 will charge and permit the passage of the signal by way of a diode 144 and a resistor 146 to the base of a transistor 148. This transistor has its emitter connected to ground and tied back to its base by way of a diode 150. The base of transistor 148 is negatively biased to produce a selected input signal threshold by being connected to a source of negative potential $-V'$ via a resistor 152. The collector of transistor 148 is connected to a source of positive potential $+V$ through two resistors 154 and 156 with the junction of these resistors, which form a voltage divider network, being connected to the base of a further transistor 158. Transistor 158 is a PNP thype having its emitter connected to the source of positive potential $+V$ by way of a resistor 160 and its collector connected to a source of negative potential $-V''$ through a resistor 162. The collector of transistor 158 serves as the output of the amplifier 146 and is shown connected to a junction 164. When capacitor 142 charges positive to top plate, this voltage is applied via the diode 144 and resistor 146 to the base of transistor 148 allowing that transistor to conduct thus dropping the voltage on the base of transistor 158 and permitting it to conduct. The signal appearing on the collector of transistor 158 and at junction 164 (a d.c. fault signal) is a pulse illustrated by FIG. 3e. This pulse begins at a time $t_2$ which is shortly after the occurrence of $t_1$, this short delay occasioned by the charging or delay time of capacitor 142. The pulse shown in FIG. 3e terminates with the firing of the next scheduled bridge rectifier, as will be hereinafter described, which firing causes the a.c. current to rise as shown by the dotted line between $t_3$ and $t_4$ in FIG. 3d. When the a.c. current rises, clamp 44 (FIG. 4a) will be activated and transistors 148 and 158 will cease conduction.

The d.c. fault signal at junction 164 is supplied as an input signal to the clamp circuit 54 to prevent the passage of normal control signals from the summing junction 48 by way of amplifier 52 as previously described. Clamping circuit 54 includes a series combination of the diode 166 and a resistor 168 forming an input to the inverting terminal of an operational amplifier 170 which has its noninverting input terminal tied to ground by way of a resistor 172. A second resistor 174 is connected in a feedback path between the output of the amplifier 170 and its inverting input. In the preferred embodiment being described, the output of amplifier 52 also forms an input to operational amplifier 170. As illustrated, the output from amplifier 52 would be a relatively negative signal such that the inversion of this signal by amplifier 170 will result in a positive output which is passed by a series diode 176 to the summing junction 60. The pulse appearing at junction 164 is of a positive value and of sufficient magnitude to drive amplifier 170 into negative saturation such that with the occurrence of this pulse the output of that amplifier is negative and hence blocked by the diode 176. This insures that the "normal" control signals originating within the rest of the system, such as is found in the aforementioned U.S. Pat. No. 3,526,819, are not passed to the instant response pulse generator 68 through summing junction 60 during the time of a d.c. fault.

Figure 3F:
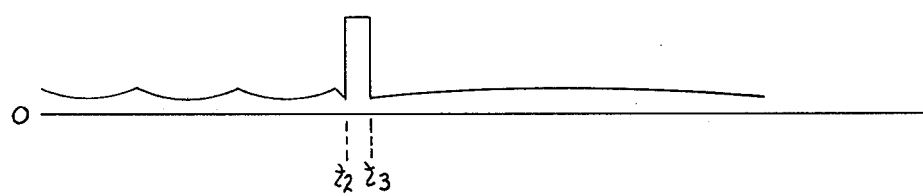

As was indicated with respect to the block diagram of FIG. 1 the control pulse actually applied to the instantaneous response generator 68 is a function of the phase advance signal from generator 50. It will be remembered that it was stated that this pulse was of a fixed magnitude such that, insofar as this portion of the circuit is concerned, the amount of phase advance demanded of the instant response pulse generator 68 is of a fixed value. To this end, the d.c. fault signal at junction 164 (FIG. 3e) is applied by way of a resistor 178 to the base of a transistor 180 which has its collector connected to a source of positive potential +V'. The emitter of the transistor 180 is tied to its base by way of a resistor 182 and the output of the phase advance signal generator 50 is taken from the emitter and supplied to the summing junction 60 by way of an additional resistor 184. Thus, so long as the signal at 164 is positive, transistor 180 is conducting applying a fixed voltage to the summing junction 60 by way of resistor 184. When the signal at 164 disappears, as was previously described, transistor 180 is rendered nonconductive and the signal removed from the summing junction simultaneously with the reapplication to the summing junction 60 of the signal from the summing junction 48 in that the clamp 54 is no longer effective. The output of the summing junction 60 is shown in FIG. 3f.

As was previously described with respect to FIG. 1, the a.c. line impedance adjustments and the current feedback signals are applied through the respective diodes 64 and 62 and the potentiometer 66 to the summing junction in the manner and for the purpose previously described. Also as was previously described with respect to FIG. 1, the instant response pulse generator 68 responds to the output of the summing junction 60, in the present example to the value of the pulse emanating from the phase advance signal generator 50 (as modified by the output of potentiometer 66) to advance the firing of the next scheduled bridge rectifier by the application of a signal on the appropriate one of the lines a through f which are the gating signals applied to the thyristors of the bridge circuit 12 of FIG. 1. This earlier than normal firing of the next scheduled to fire rectifier will result in the placement of a sufficiently negative bias on the improperly conducting rectifier to render it nonconductive and the d.c. fault is corrected.

Thus it is seen that there has been provided an economical and effective means for determining the existence of an improperly conducting rectifier within the supply bridge of a d.c. motor control circuit and for providing remedial action with respect thereto. While a preferred embodiment of this invention as been illustrated and described it will be understood from the foregoing that various alternations can be made in the disclosed detecting and correcting system without departing from the broad concepts of this invention. The appended claims, therefore, are intended to cover all such changes and modifications as fall within the true spirit and scope of this invention.

What is claimed is:
1. In a motor control system of the type in which a d.c. motor is supplied with power from an a.c. source by way of a rectifier bridge the individual rectifiers of which are rendered conductive in a prescribed sequence and at controllable times, means for detecting the existence of an improperly conducting rectifier and for providing remedial action with respect thereto comprising:
   a. means for providing a first control signal in response to a substantial difference between the value of the output voltage of the bridge and the counter electromotive force of said motor;
   b. means for providing a second control signal in response to a decrease in value in the alternating current supplied to said bridge from said source;
   c. means for providing a third control signal in response to the value of the motor terminal voltage being at substantially zero volts; and,
   d. means responsive to said first, second and third control signals to effect a change in the time of rendering conductive at least one of the rectifiers of the bridge.

2. The invention in accordance with Claim 1 wherein the a.c. source is polyphase.

3. A system for the control of a d.c. motor supplied from an a.c. source comprising:
   a. a power conversion unit for supplying power to the motor from the source in which a plurality of controlled rectifiers are sequentially rendered conductive at controlled times in response to prescribed motor operating parameters; and,
   b. means for detecting the existence of an improperly conducting rectifier and for providing remedial action with respect thereto including,
      1. means for providing a first control signal in response to a substantial difference between the value of the output voltage of said conversion unit and the counter electromotive force of said motor,
      2. means for providing a second control signal in response to a decreasing value in the alternating current supplied to said unit from the source,
      3. means for providing a third control signal in response to the value of the motor terminal voltage being at substantially zero volts, and
      4. means responsive to said first, second and third control signals for inhibiting the firing control of said rectifiers in response to said operating parameters and for effecting a signal for the firing control of said rectifiers.

4. A system for the control of a d.c. motor supplied from an a.c. source comprising:
   a. a power conversion unit in wich a plurality of controlled rectifiers are sequentially rendered conductive at controlled times to deliver variable d.c. power from the source to the motor; and,
   b. means for determining the existence of an improperly conducting rectifier and for providing remedial action with respect thereto; comprising,
      1. means to derive a first control signal having a value proportional to the difference between the instantaneous value of the voltage applied to said motor and the counter electromotive force of the motor,
      2. means for providing a second control signal in response to a decreasing value in the alternating current supplied to said conversion unit from the source,
      3. means for providing a third control signal in response to the value of the motor terminal voltage being substantially zero volts,
      4. inhibiting means responsive to said second and third control signals to selectively control the passage of said first control signal, and
      5. means responsive to said first control signal when passed by said inhibiting means to produce an additional signal when said first control signal exceeds a predetermined value for varying the time at which at least one of the rectifiers of the conversion unit is rendered conductive.

5. A system for the control of a d.c. motor supplied from an a.c. source comprising:

a. a power conversion unit for supplying power from the source to the motor, said conversion unit including a plurality of controlled rectifiers sequentially rendered conductive at controlled times in response to motor operating parameters; and, b. means for detecting the existence of an improperly conducting rectifier and for providing remedial action with respect thereto including,
  1. means to derive a first control signal having a value proportional to the difference between the instantaneous value of the voltage applied to the motor and the counter electromotive force of the motor,
  2. means for providing a second control signal in response to a decreasing value in the alternating currents supplied to said unit from the source,
  3. means for providing a third control signal in response to the value of the motor voltage being substantially at zero volts,
  4. inhibiting means responsive to said second and third control signals to control the passage of said first control signal,
  5. means including a threshold amplifier responsive to said first control signal, when passed by said inhibiting means, for providing an additional signal when said first control signal exceeds a prescribed value, said additional signal serving to remove the conversion unit from the control of the operating parameters and to vary the time of firing of at least one of said rectifiers in response to said additional signal.

6. The invention in accordance with claim 5 wherein said additional signal causes the rectifier next scheduled to fire in sequence to advance in time for normal.

7. The invention in accordance with claim 5 additionally including compensating means for adding a second variation in time in accordance with the value of the a.c. line impedance.

8. The invention in accordance with claim 7 wherein said compensating means is adjustable.

9. The invention in accordance with claim 7 wherein the second variation in time is a fixed proportion of the first variation in time.

10. A system for the control of a d.c. motor supplied from an a.c. source comprising:
  a. a power conversion unit for supplying power from the source to the motor, said unit including a plurality of controlled rectifiers sequentially rendered conductive to provide variable d.c. power to said motor; and,
  b. means for determining the existence of an improperly conducting rectifier and for providing remedial action with respect thereto; comprising,
    1. means to derive a first control signal having a value proportional to the difference between the instantaneous value of the voltage applied to said motor and the counter electromotive fource of said motor,
    2. means for providing a second control signal in response to a decreasing value in the alternating current supplied to said conversion unit from said source,
    3. means for providing a third control signal in response to the value of the motor voltage being substantially zero volts,
    4. inhibiting means including first and second clamping means responsive respectively to said second and third control signals to control the passage of said first control signal,
    5. means including a threshold amplifier responsive to said first control signal when passed by said inhibiting means to produce an additional signal when said first control signal exceeds a predetermined value, and
    6. means responsive to said additional signal for advancing the time of rendering conductive the next scheduled to conduct rectifier of said conversion unit to thereby render nonconductive the improperly conducting rectifier.

* * * * *